US008209688B2

United States Patent
Martin

(10) Patent No.: US 8,209,688 B2
(45) Date of Patent: Jun. 26, 2012

(54) ENTERPRISE JAVA BEAN (EJB) BASED ENTERPRISE PRINTING ARCHITECTURE

(75) Inventor: Craig W. Martin, Herietta, NY (US)

(73) Assignee: Xerox Corporation, Norwalk, CT (US)

( * ) Notice: Subject to any disclaimer, the term of this patent is extended or adjusted under 35 U.S.C. 154(b) by 1767 days.

(21) Appl. No.: 11/262,866

(22) Filed: Oct. 31, 2005

(65) Prior Publication Data

US 2007/0100837 A1    May 3, 2007

(51) Int. Cl.
*G06F 9/46* (2006.01)
(52) U.S. Cl. ........................................... 718/100
(58) Field of Classification Search .................. 707/500; 709/232
See application file for complete search history.

(56) References Cited

U.S. PATENT DOCUMENTS

| 5,933,144 A * | 8/1999 | Alcorn | 715/809 |
| 2002/0147739 A1* | 10/2002 | Clements et al. | 707/500 |
| 2005/0086360 A1* | 4/2005 | Mamou et al. | 709/232 |

OTHER PUBLICATIONS

*Simplified Guide to the Java 2 Platform, Enterprise Edition*, Sun Microsystems, Inc., Sep. 1999.

* cited by examiner

*Primary Examiner* — Meng An
*Assistant Examiner* — Eric C Wai
(74) *Attorney, Agent, or Firm* — Kermit D. Lopez; Luis M. Ortiz; Melissa A. Asfahani

(57) ABSTRACT

Features of Enterprise Java Bean (EJB), Enterprise Printing Bean (EPB), JAVA, J2EE, and document authoring are combined to enable a robust enterprise printing architecture. A Java object encapsulates a print job specification and provides a framework enabling access control to print jobs as well as providing audit capabilities. Print control languages can be specified using methods provided by the Java object. Actual process implementation can be supplied via a server enabling another layer of security and control. A user wanting to securely print a job supplies appropriate credentials to the print job bean to gain access to the content and print server credentials allow printing of the print job. The EJB API is extendable to enable all of the J2EE capabilities found on standard EJBs to be applied to print Jobs. Further, a new Java API provides a more powerful page description language than that found in other printing languages.

13 Claims, 2 Drawing Sheets

ENTERPRISE JAVA BEAN (EJB) BASED ENTERPRISE PRINTING ARCHITECTURE

TECHNICAL FIELD

Embodiments relate to enterprise printing. More particularly, embodiments relate to methods in support of the creation of secure print jobs. Embodiments further relate to the use of JavaBeans™ technology to enable secure enterprise printing architectures.

BACKGROUND

In general a print job is a transitory task that provides limited feedback, has little memory of the actual print process, and has limited options in terms of security. For example, take the case of a highly classified document that is created on the east coast and must be sent to a DOD contractor on the west coast. Emailing such a document to the east coast for printing (or viewing) would be extremely dangerous from a security standpoint. Other, more expensive techniques would need to be employed to transfer the knowledge. In addition to emailing the document, let's say that we want to place security restrictions on printing, limit the document size to be printed, keep an exact record of (or even limit) how many times it is printed, and provide an extensive interface to the print process. These are all problems that can be solved in today's world by employing a variety of complex techniques. What would be more desirable is a unified printing architecture that simplifies this type of document management.

The Java 2 Platform, Enterprise Edition™ (J2EE) defines the standard for developing multi-tier enterprise applications. Java™, JavaBeans™ JavaServlets™, and Enterprise JavaBeans™ (EJBs) as used herein are trademarks or registered trademarks of Sun Microsystems, Inc. in the United States and other countries. The J2EE platform simplifies enterprise applications by basing them on standardized, modular components, by providing a complete set of services to those components, and by handling many details of application behavior automatically, without complex programming. The J2EE platform adds full support for Enterprise JavaBeans™ components, JavaServlets™ application program interface (API), JavaServer™ Pages and XML technology. The J2EE standard includes complete specifications and compliance tests to ensure portability of applications across the wide range of existing enterprise systems capable of supporting the J2EE platform. In addition, the J2EE specifications now ensure Web services interoperability through support for the WS-I Basic Profile.

J2EE is designed to support applications that implement enterprise services for customers, employees, suppliers, partners, and others who make demands on or contributions to the enterprise. Such applications are inherently complex, potentially accessing data from a variety of sources and distributing applications to a variety of clients. To better control and manage these applications, the business functions to support these various users are conducted in the middle tier. The middle tier represents an environment that is closely controlled by an enterprise's information technology department. The middle tier is typically run on dedicated server hardware and has access to the full services of the enterprise. J2EE applications often rely on the EIS-Tier to store the enterprise's business-critical data. This data and the systems that manage it are at the inner-core of the enterprise.

The present inventor has found that with the advent of the J2EE architecture it is now possible to harness the Java™ and J2EE API to provide an even more powerful and more secure printing environment. The present inventor has created an improvement to the EJB API that enables all of the J2EE capabilities found on standard EJBs to be applied to print jobs. In addition, the present inventor provides a new Java™ API that provides a more powerful page description language than that found in Postscript®.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with the embodiment, the EJB API is extended to enable all J2EE capabilities found on standard EJBs to be applied to Print Jobs.

In accordance with another feature of the embodiment, a secured enterprise printing system utilizing the JavaBeans™ application programming interface and operable over a data network can be provided that includes a Web interface enabling the creation, access to, and manipulation of enterprise print beans (EPBs) over a data network; a J2EE container storing and securing EPBs; a licensed controller authorizing access to EPBs; an information database tracking EPB creation, access and manipulation activity; and an input output terminal for printing a print job associated with an EPB.

In accordance with another feature of the embodiment, an improved Java object encapsulates a print job specification and provides a framework that enables access control to a print job as well as providing audit capabilities. Print control language can be specified using methods provided by the Java object. The actual implementation of the methods can be supplied by a server enabling another layer of security and control. A user wanting to securely print a job supplies appropriate credentials to the print job bean to gain access to the content and print server credentials allow printing of the print job.

In accordance with another feature of the embodiment, a method enabling security and secured access to printable documents. An author can creates a EPB document including security using J2EE security API and a collaborative authoring program. The EPB document is routed at the request of the author to a J2EE enabled container wherein the EPB document is secured and stored. The J2EE enabled container checks the EPB document to verify if J2EE security is applied to it.

In accordance with another feature of the embodiment, a customer requests access to/rendering of the EPB-associated document at the J2EE enabled container. The J2EE container receives the customer's request and verifies customer authorization. If the customer is deemed to be authorized access by the J2EE container, the document is accessed by or rendered on behalf of the customer.

In accordance with another feature of the embodiment, document access/rendering event information can be tracked by a server. Document access/rendering event information can also be stored in the server for future access by the author.

Basing an Enterprise Printing System around a new type of Enterprise JavaBean™ which can be referred to an Enterprise Printing Bean (EPB) provides the following advantages:

J2EE security can be applied to print jobs.

J2EE database technology can track print jobs.

J2EE web technology can provide an interface to user print jobs.

The EPB JAR file can't be compromised (unless enabled by author).

The EPB API can be licensed on a per controller basis.

The EPB authoring technology can be licensed to third parties.

The EPB API can reside in C/C++ or Java™-based controllers.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE EMBODIMENTS

The particular values and configurations discussed in these non-limiting examples can be varied and are cited merely to illustrate an embodiment of the present invention and are not intended to limit the scope of the invention.

With the advent of the J2EE architecture it is now possible to harness the Java™ and J2EE API to provide an even more powerful and more secure printing environment. An improvement to the EJB API is herein described that enables all of the J2EE capabilities found on standard EJBs to be applied to Print Jobs. In addition a new Java™ API that provides a more powerful page description language than that found in, for example, Postscript® is now possible.

The present embodiment incorporates features of Enterprise JavaBeans™ (EJB), Enterprise Printing Bean (EPB), Java™, J2EE, and document authoring to enable a robust enterprise printing architecture.

Figure 1:
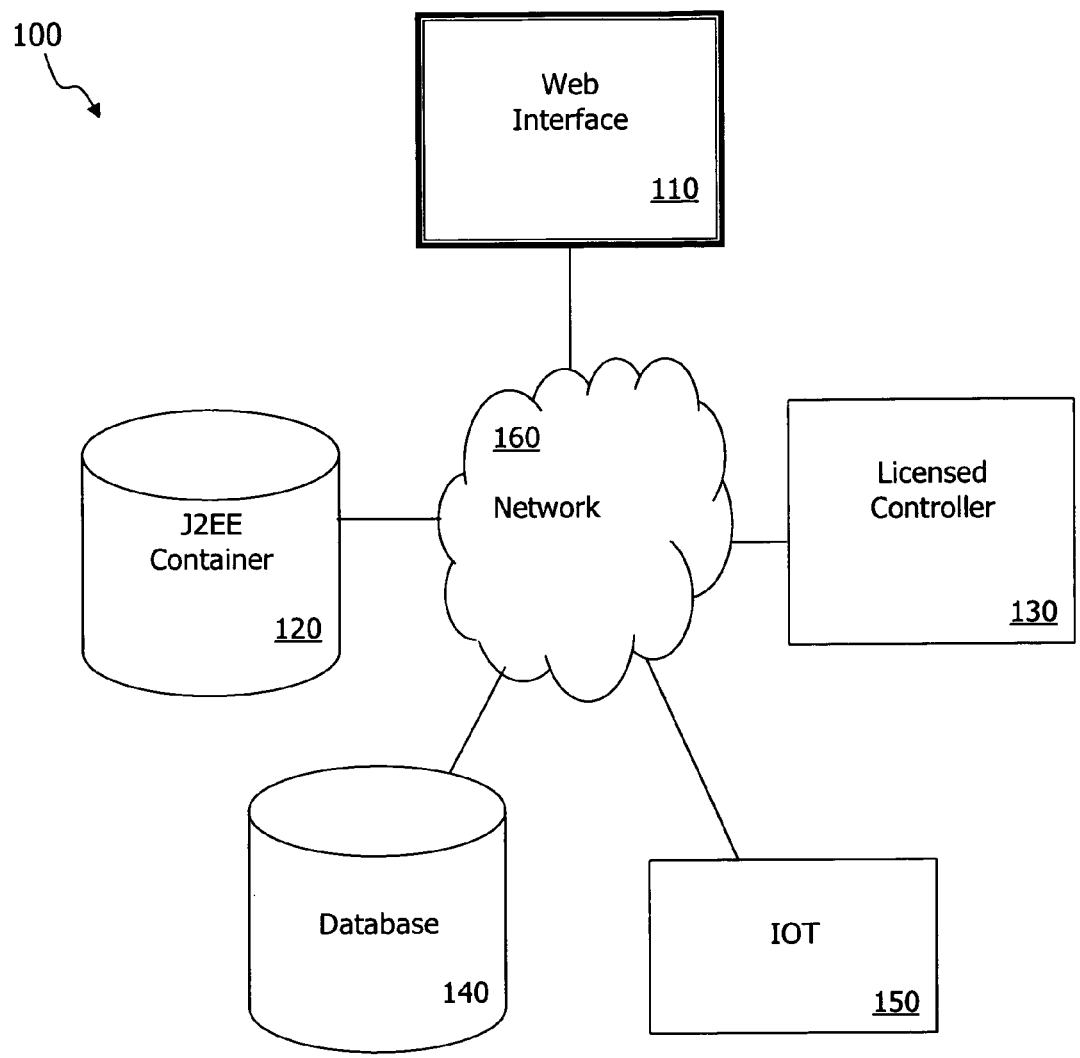
FIG. 1 illustrates a block diagram of an enterprise JavaBeans™-based enterprise printing architecture in accordance with the preferred embodiment.

A system architecture 100 of modules enabling the preferred embodiment are shown in FIG. 1. Authors and customers (e.g., user) can create, access and manipulate EPBs locally or remotely using a standard Web interface 110. Remote access would require and utilize a connection (wired or wireless) to a data network 160. A J2EE container 120, licensed controller 130, information database 140 and IOT 150 can all be accessible over the network 160.

An application server typically houses a J2EE container wherein enterprise java beans can be deployed. In an open source module like JBoss there is located a deploy directory wherein Java beans can be held and wherein an application server notices beans and checks the API and the bean to makes sure it is valid and everything needed to deploy it is loaded.

A link to a database can be used to allow the author to set up a print limit and access limitations as part of the java bean authoring. When a file is processed/printed, the database can be checked for limits, access and status. As the print process proceeds forward, statistics and other information regarding the print process can be recorded in the database.

A web interface 110 can be coupled into the J2EE container 120, which is web enabled to communicate various aspects of the file processing occurring in the J2EE container 120 during processing in real time to the web interface 110 if needed. Once the bean represented job is in the container 120, nothing can be done to the job unless authorized by a licensed controller 130. The licensed controller 130 understands calls that are going to be made by the bean across a remote method invocation (RMI) link. Inside the EPB can be a whole series of commands (e.g., draw commands), or a superset of commands. The commands cannot operate unless communication is supported over RMI and access to the API is approved by the licensed controller 130.

The licensed controller 130 is the only thing that knows how to interpret the calls. A document can fall into the hands of the wrong person, but cannot be read without the aide of the licensed controller 130 and without its authorization. All that would be in the document is a series of calls that cannot be interpreted without a licensed controller 130. The licensed controller 130 interprets calls coming over RMI and generates a rasterized image that is transferable into a input/output transport (IOT) 150 where paper and toner is also located, and where the document eventually can be rendered.

More than likely, the J2EE container 120 and licensed controller 130 will be co-resident on a single computer platform; however, they can also be on separate computers/servers because RMI does not care if the two are co-resident. Theoretically, each component can be run on similar or separate servers, desktop PCs or laptops.

The Database 140 can be co-resident on a common computer platform with the J2EE container 120 and/or licensed controller 130; but in situations where the author is in one location and desires to provide documents for single use/purchase over the internet to customer located remotely, the database 140 can control the provision and rendering of documents by tracking beans sold to and submitted by customers to the database 140; wherein the beans can represent a request to print data. A bean is transmitted over the internet to servers and represents the amount of prints a customer is allowed; the bean therefore can be monitored and control the release of information from associated databases.

The web interface 110 can be located anywhere on a network 160 to access and manage beans and information. An author can use the web interface 110 to encode beans. An author can also encode a request into a bean that the author be emailed whenever a document associated with the bean is being printed on a particular server. This provides an effective way for an author to track or audit the use of beans.

In a preferred printing-related implementation, an actual print job itself would be a specialized version of a session bean. This type of print job can be contained in a session bean that extends (inherits from) an enterprise API (e.g. Enterprise Printing Bean—EPB). All critical information that makes the print job what it is would be contained in this EJB (jar file). The API added by an enterprise can allow the bean to print itself once deployed in an EJB container such as: JBoss, Web Logic, or Web Sphere. The API can include draw, font, color, security, and many other constructs to allow the Printing Bean to do its job. These functions would be analogous to post script commands, but with all the power of the Java™ API. Since the code contained in the Bean would be binary and the actual functions accessed by enterprise printing bean API would be in a remote location, the print job could not be used (or compromised) by opening it and inspecting its contents (unless specific steps were taken to enable this capability).

Figure 2:
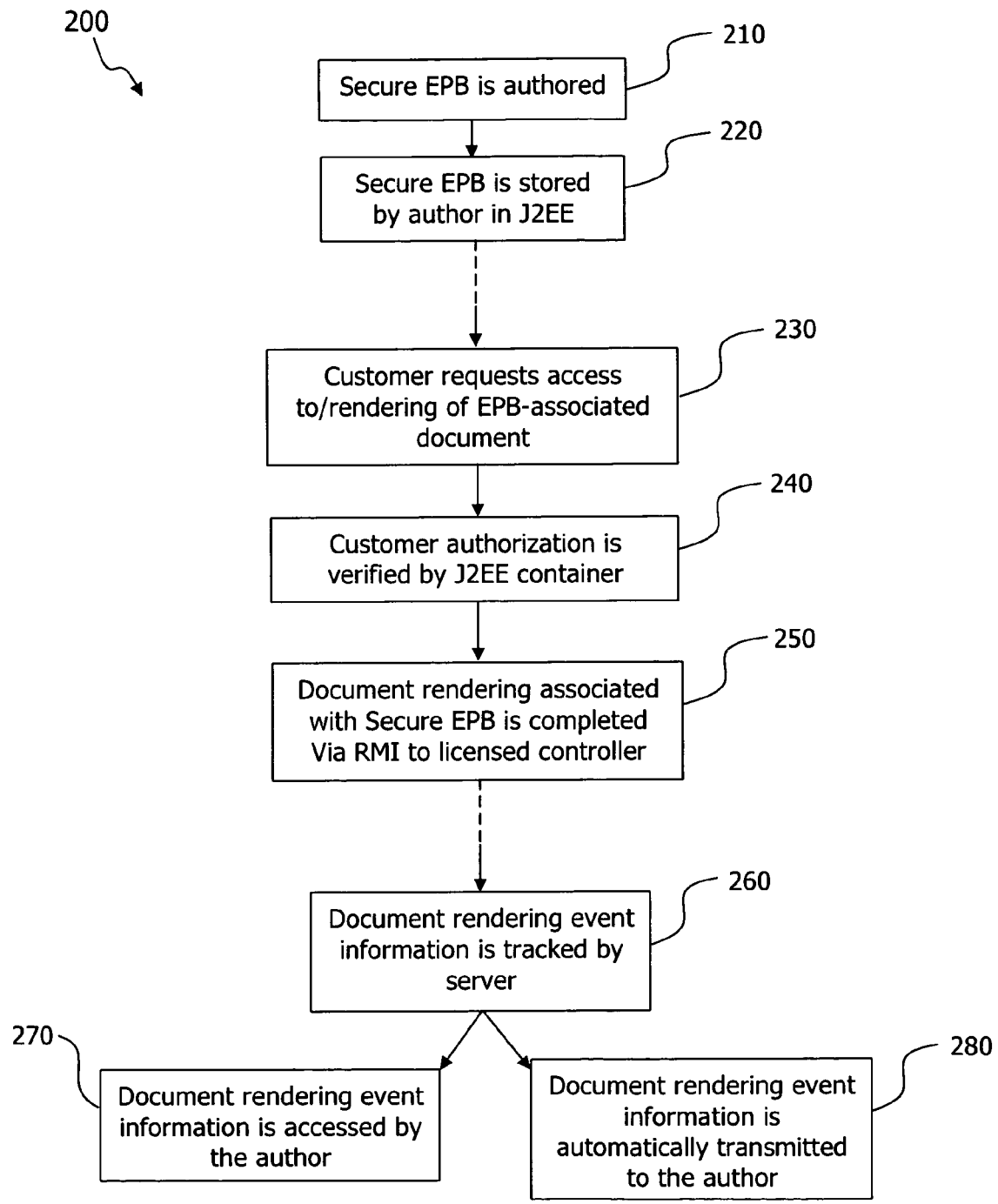
FIG. 2 illustrates a flow diagram of a method of using the enterprise JavaBeans™-based enterprise printing architecture in accordance with the preferred embodiment.

Referring to the flow diagram 200 show in FIG. 2, during use of the inventive aspects taught herein, the author creates a secure EPB document using a collaborative program (e.g., Photoshop, AutoCad, etc.) as shown in step 210. A program, similar to Photoshop, that creates different file formats, can create enterprise java bean formatted files. The secure EPB is routed by the author to a J2EE container as shown in step 220, which notices the existence of the secure EPB and loads it as shown in step within the container. The J2EE enabled container will also check to see if appropriate parts of the J2EE security API are applied to the secure EPB as part of step 220.

A customer can request access to/rendering of the EPB-associated document as shown in 230. When such a request is received, the J2EE container verified customer authorization as shown in step 240. If the customer is deemed to be authorized access by the J2EE container, the document can be accessed/rendered on behalf of the customer as shown in step 250.

As shown in step 260, document access/rendering event information can be tracked by a server. The information is stored in the server for future access by the author as shown in step 270, and/or the author can be automatically notified of an access/rendering event via the server as shown in step 280. It should be appreciated that the author's email address can be stored in the server for access during automatic notification. It can also be appreciated that information can be stored in and remotely accessed by the author from the server.

As previously mentioned, the draw, font, color, and other commands that populate the Enterprise Printing Bean API would not actually be implemented in the Printing Bean itself. This prevents the JAR file that holds the EPB from being printed without authority (printing in this design will be subject to EJB security), prevents printing without licensing the technology from the enterprise, and keeps the size of the EPB to a minimum. In this case the actual implementation of the EPB API can reside in a library that is contained in the controller that receives the print job. The EPB will make calls from the EJB container via remote method invocation (RMI) to a licensed controller. The controller can have the EBP API licensed and enabled via a enterprise feature key.

By having Java™ at the basis of en enterprise printing language, the printing constructs no longer need to be the terse and limited types found in post script and its clones. The printing language can now be the Java™ API and any extensions chosen to apply to it. In addition, in using a J2EE EJB container to facilitate printing, an enterprise and its users are now able to leverage all the capabilities of the J2EE interface during execution of print jobs. This includes container-managed persistence (CMP) built into the foundation of most application servers. This means that every step in the execution of the print process can be easily recorded in a database and made available for inspection. In addition, any of the RMI calls made by the EPB can have security constraints applied to them (by the author of the job) in order to limit accessibility to the document(s). A web services interface (using the latest J2EE technologies such as JSP, Servlets, and Struts) can be applied to the front end to facilitate administration, workflow, and documentation of the printing process.

The present invention opens a new frontier for Print Authoring Tools. These tools would essentially produce an EJB contained in a JAR file that abides by the enterprise EPB API. Basing an Enterprise Printing Architecture (EPA) around a new type of Enterprise JavaBeans™ which can be referred to an Enterprise Printing Bean (EPB) provides the following advantages:

J2EE security can be applied to our print jobs.

J2EE database technology can track our print jobs.

J2EE web technology can provide an interface to user print jobs.

The EPB JAR file can't be compromised (unless enabled by author).

The EPB API can be licensed on a per controller basis.

The EPB authoring technology could be licensed to third parties.

The EPB API can reside in C/C++ or Java™-based controllers.

It should be noted that the Java™ object would not, most likely, contain data. Otherwise the archive could be unpacked and compromise the secured information. Rather, the image would be rendered by way of Java™ API calls combined with security API calls made across RMI to a licensed (for profit) controller. It would be a print job made out of a Java program (sort of like Postscript® is a program). That way even if the archive is unpacked, the perpetrator only has a binary program that won't execute unless it can contact the security layer of the Application Server.

The present invention is more advanced than digital rights management software in its ability to track and record the progress of the print job. The present processes can utilize any function that is available by way of Application Server that hosts the JavaBeans™. For example, the author of the Bean could have the Bean email him each time it is printed. The bean could report back to the user a list of all such restrictions prior to printing, In addition, a complete record of all such transactions could be recorded in the database each time a print is made with provisions for viewing the information as needed. These same rules could also be applied to viewing the information (instead of printing it to paper, print to PDF).

Lastly, the design can continue to advance with that standard being that it is based on the open J2EE standard. So as J2EE application servers become more and more powerful and feature rich, enterprises will be able to leverage those improvements.

The invention claimed is:

1. A computer-implemented secured enterprise printing system that utilizes a multi-tier enterprise development application programming interface, and operates over a data network, using a data-processing apparatus, comprising:
   a processor;
   a data bus coupled to said processor; and
   a computer-usable medium embodying computer code, said computer-usable medium being coupled to said data bus, said computer program code comprising instructions executable by said processor and configured for:
   creating, accessing, and manipulating an enterprise print bean by an author, wherein said enterprise print bean comprises a reusable software component that conforms to design and naming conventions that enable said enterprise print beans to be combined to create an application, over said data network using a Web interface;
   storing and securing said enterprise print bean, using a multi-tier enterprise development application programming-enabled container;
   authorizing access to said enterprise print bean using a licensed controller;

tracking said enterprise print bean creation, access and manipulation activity using an information database;

printing a print job associated with said enterprise print bean using an input output terminal;

providing a first memory within an application server to process and print said enterprise print bean, and checking said information database for limits, access and status;

providing a second memory associated with said multi-tier enterprise development application programming-enabled container to process and print said enterprise print bean, and checking said information database for limits, access, and status; and linking between said Web interface and said information database to allow the enterprise print bean author to set up print and access limitations such as printer feedback, memory of an actual print process, printing security options, document size limitations, a record of how many times a document is printed, and a limitation on number of printing, as part of authoring said enterprise print bean.

2. The system of claim 1 further comprising an application server housing said multi-tier enterprise development application programming-enabled container for deploying said enterprise print bean, wherein said application server recognizes said enterprise print bean, checks said enterprise print bean's application program interface, validates said enterprise print bean, and loads all necessary enterprise print bean deployment information.

3. The system of claim 2 further comprising a deploy directory to hold said enterprise print bean for deployment.

4. The system of claim 1 further comprising an enterprise print bean's application programming interface extension to provide all multi-tier enterprise development application programming capabilities of said enterprise print bean as applied to a print job.

5. A method enabling security and secured access to printable documents, comprising:

an author creating an enterprise print bean document, wherein said enterprise print bean document comprises a reusable software component that conforms to certain design and naming conventions;

including a security feature within said enterprise print bean document using a multi-tier enterprise development security application program interface and a collaborative authoring program;

routing said enterprise print bean document at the request of an author a customer to access and render said enterprise print bean document to a multi-tier enterprise development application programming-enabled container;

securing and storing said enterprise print bean document within said multi-tier enterprise development application programming-enabled container;

said multi-tier enterprise development application programming-enabled container checking said enterprise print bean document to verify application of multi-tier enterprise development application program-type security and customer access authorization;

accessing and rendering said enterprise print bean document on behalf of said customer if said customer is deemed to have authorized access to said multi-tier enterprise development application programming-enabled container;

establishing print and access limitations such as printer feedback, memory of an actual print process, printing security options, document size limitations, a record of how many times a document is printed, and a limitation on number of printing, as part of authoring said enterprise print bean document;

tracking said enterprise print bean document's access and rendering event information using an information server; and storing said enterprise print bean document's access and rendering event information in said information server for future access by said customer.

6. The method of claim 5, further comprising:

said multi-tier enterprise development application programming-enabled container receiving said customer's access and rendering request and verifying customer access authorization.

7. The method of claim 6 further comprising said information server automatically notifying said enterprise print bean document's author via an email address associated with said author and stored in said information server, of said access or rendering event.

8. The method of claim 5 further comprising extending said enterprise print bean's application programming interface to provide all multi-tier enterprise development application programming capabilities of said enterprise print bean document as applied to a print job.

9. The method enabling security and secured access to printable documents comprising the steps of:

accessing a Web interface having a multi-tier enterprise development security application program interface, and a multi-tier enterprise development collaborative authoring program to create a secured enterprise print bean document, wherein said secured enterprise print bean document comprises a reusable software component that conforms to design and naming conventions that permit said secured enterprise print bean document to be combined to create an application;

routing said secured enterprise print bean document to a multi-tier enterprise development application programming-enabled container wherein said secured enterprise print bean document is stored for subsequent access by an authorized customer;

requesting access to said secured enterprise print bean document stored within said multi-tier enterprise development application programming-enabled container by a customer;

receiving said request using a multi-tier enterprise development application programming-enabled container to access said secured enterprise print bean document and verifying authorization to access said secured enterprise print bean document;

checking said secured enterprise print bean document upon said secured enterprise print bean document's receipt to verify that multi-tier enterprise development application program-type security is applied to said secured enterprise print bean document by said multi-tier enterprise development application programming-enabled container;

accessing said secured enterprise print bean document from within said multi-tier enterprise development application programming-enabled container if an access controller authorizes access to said secured enterprise print bean document to said customer; and establishing print and access limitations such as printer feedback, memory of an actual print process, printing security options, document size limitations, a record of how many times a document is printed, and a limitation on number of printing, as part of authoring said enterprise print bean.

10. The method of claim 9, further comprising said customer requesting to print said accessed secured enterprise print bean document by a network printer.

11. The method of claim 9, further comprising tracking said enterprise print bean document access information using a server, wherein said server stores said secured enterprise print bean document's access information in a server for future access by said secured enterprise print bean document's author.

12. The method for claim 9, further comprising said server automatically notifying said secured enterprise print bean document's author via an email address associated with said author and stored in said server, of said access or rendering event.

13. The method of claim 9 further comprising extending said secured enterprise print bean document's application programming interface to provide all multi-tier enterprise development application programming capabilities of said secured enterprise print bean document as applied to a print job.

* * * * *